US012473845B2

(12) United States Patent
Wolczyk et al.

(10) Patent No.: US 12,473,845 B2
(45) Date of Patent: Nov. 18, 2025

(54) SYSTEM AND METHOD FOR APPLYING TRIM BALANCE TO A MODULE OF THE GAS TURBINE ENGINE

(71) Applicant: Pratt & Whitney Canada Corp., Québec (CA)

(72) Inventors: Sean Wolczyk, Georgetown (CA); Louis Lavoie, Brampton (CA); Danny Noiseux, Québec (CA); Ivan Veljkovic, Burlington (CA); Anthony Topping, Québec (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/630,542

(22) Filed: Apr. 9, 2024

(65) Prior Publication Data

US 2025/0314182 A1    Oct. 9, 2025

(51) Int. Cl.
*F01D 25/28*  (2006.01)
*F01D 25/24*  (2006.01)

(52) U.S. Cl.
CPC .......... *F01D 25/28* (2013.01); *F01D 25/243* (2013.01)

(58) Field of Classification Search
CPC . F01D 5/027; F01D 5/025; F01D 5/06; F05D 2230/60; F05D 2230/68; B23P 15/10; G01M 1/00; G01M 1/02; G01M 1/036; G01M 1/024
See application file for complete search history.

(56) References Cited

U.S. PATENT DOCUMENTS

| | | |
|---|---|---|
| 8,668,457 B2 | 3/2014 | Juh |
| 10,190,655 B2 | 1/2019 | Luinaud et al. |
| 10,920,621 B2 | 2/2021 | Murphy et al. |
| 11,143,031 B2 | 10/2021 | Luinaud et al. |
| 2003/0147742 A1 | 8/2003 | Thomas |
| 2015/0361894 A1* | 12/2015 | Murphy ................ F01D 25/285 29/888.012 |
| 2018/0172111 A1 | 6/2018 | Luinaud et al. |

FOREIGN PATENT DOCUMENTS

EP    2955339 A1    12/2015

OTHER PUBLICATIONS

Extended European Search Report for EP Application No. 25169198.6, dated Aug. 7, 2025, pp. 1-12.

* cited by examiner

*Primary Examiner* — Nathaniel E Wiehe
*Assistant Examiner* — Maxime M Adjagbe
(74) *Attorney, Agent, or Firm* — CANTOR COLBURN LLP

(57) ABSTRACT

A system for applying balancing trim to a module of a gas turbine engine, the module having a compressor having a forward shaft and an aft hub, a turbine connected to the aft hub, and the turbine having a turbine case and an aft shaft, the system having: a support bracket that mounts to the turbine case and supports the module when testing for unbalances, wherein the support bracket has: an outer periphery; outer mounting apertures at the outer periphery, wherein the outer mounting apertures are sized to receive fasteners to connect the support bracket to the turbine case; a center aperture defined by an inner periphery, wherein the center aperture is sized to receive the aft hub; and weight positioning slots defined between the outer mounting apertures and the center aperture; and wherein the outer periph- (Continued)

ery and the inner periphery are axially spaced apart from each other.

7 Claims, 8 Drawing Sheets

SYSTEM AND METHOD FOR APPLYING TRIM BALANCE TO A MODULE OF THE GAS TURBINE ENGINE

BACKGROUND

Exemplary embodiments pertain to the art of gas turbine engines and more specifically to a system and method for applying trim balance to a module of the gas turbine engine.

Gas turbine engines are subject to vibration first pass yield (FPY) test to determine whether they have excessive vibrations. Customarily, engines are fully assembled when tested. Failing the vibration test may require an engine disassembly to enable access the high pressure turbine to iteratively add trim weights to correct the unbalance. Several repetitions of this process may be necessary. This activity may be time consuming and costly.

BRIEF DESCRIPTION

Disclosed is a system for applying balancing trim to a module of a gas turbine engine, the module including a compressor having a forward shaft and an aft hub, a turbine connected to the aft hub, and the turbine having a turbine case and an aft shaft, the system including: a support bracket that mounts to the turbine case and supports the module when testing for unbalances, wherein the support bracket includes: an outer periphery; outer mounting apertures at the outer periphery, wherein the outer mounting apertures are sized to receive fasteners to connect the support bracket to the turbine case; a center aperture defined by an inner periphery, wherein the center aperture is sized to receive the aft hub; and weight positioning slots defined between the outer mounting apertures and the center aperture; and wherein the outer periphery and the inner periphery are axially spaced apart from each other.

In addition to one or more aspects of the system or as an alternate, the system includes: a cradle having a forward end, a cradle body that extends from the forward end to an aft end, wherein the cradle body has: a bottom runner extending from the forward end to the aft end of the cradle; a forward support attached to the bottom runner at the forward end that supports the forward shaft; an intermediate support attached to the bottom runner intermediate the forward and aft ends of the cradle that supports the support bracket; and an aft support connected to the bottom runner that supports the aft shaft.

In addition to one or more aspects of the system or as an alternate, the bottom runner is a rigid beam extending along a beam axis.

In addition to one or more aspects of the system or as an alternate, the forward support has: a first base member extending transversely to the beam axis from a first end to a second end; first and second outer arms that extending upwardly and away from each other at an acute angle, from the first and second ends of the first base member to first and second arm top ends to define first and second outer arm profile shapes; a top member extending transversely to the beam axis between the first and second arm top ends and is longer than the first base member; a center arm extending upwardly from a center of the first base member to a center of the top member, wherein the center of the top member defines a semicircular profile.

In addition to one or more aspects of the system or as an alternate, the forward support has: a semicylindrical bracket supported in the center of the top member and that is configured to support the forward shaft; and a semicircular bracket that locks onto the semicylindrical bracket to secure the forward shaft to the cradle.

In addition to one or more aspects of the system or as an alternate, the forward and aft supports are configured the same as each other.

In addition to one or more aspects of the system or as an alternate, the intermediate support has: a second base member extending transversely to the beam axis and having a same length as the first base member; third and fourth outer arms that extend upwardly and away from each other, parallel to the first and second outer arms, to third and fourth top ends that are height-wise and transversely aligned with the first and second arm top ends and parallel to the first and second arm top ends; and a continuous inner surface, defined between the second base member and the third and fourth outer arms, that has a semicircular profile to seat the outer periphery of the support bracket, and wherein the intermediate support has fastener apertures through which the fasteners extend into the outer mounting apertures of the support bracket, to fixedly mount the support bracket to the cradle.

In addition to one or more aspects of the system or as an alternate, the system includes: a first support railing extending between the forward and aft supports of the cradle along a first transverse side of the cradle; and a second support railing extending between the forward and aft supports of the cradle along the second transverse side of the cradle.

In addition to one or more aspects of the system or as an alternate, the system includes first and second guide blocks connected to the bottom runner and extending transversely to the beam axis, disposed adjacent to the intermediate support to guide a drive belt that extends over the aft hub and spins the module to test for the unbalances.

In addition to one or more aspects of the system or as an alternate: the support bracket defines inner mounting apertures, between the inner periphery and the weight positioning slots, and the system includes: a forward tube clamp that is releasably clamped against the forward shaft; and an aft tube clamp that is releasably clamped against the aft hub of the module, adjacent to the support bracket, wherein the aft tube clamp includes mounting tabs that define through-holes through which the fasteners extend into the inner mounting apertures in the support bracket to fixedly mount the aft tube clamp to the support bracket, and wherein the aft tube clamp is releasably secured to the assembly stand.

In addition to one or more aspects of the system or as an alternate, the aft hub has an outer surface and the aft tube clamp has an inner surface with a shape that is contoured to match the outer surface of the aft hub.

In addition to one or more aspects of the system or as an alternate, the system includes: a hoist including a boom arm extending from a boom arm forward end to a boom arm aft end; a forward gripping arm connected to the boom arm forward end, extending downward to releasably connect with the forward tube clamp; and an aft gripping arm connected to the boom arm aft end and extending downward to releasably connect with the aft tube clamp.

Further disclosed is a method of applying balancing trim to a module of a gas turbine engine, including: attaching a support bracket to a forward end of a turbine of the module so that an inner aperture of the support bracket surrounds a portion of an aft hub of a compressor of the module; supporting a forward shaft of the module on a forward support of a cradle that is attached to a bottom runner of the cradle; supporting the support bracket on an intermediate support of the cradle that is attached to the bottom runner of the cradle; and supporting an aft shaft of the module with an aft support of the cradle that is attached to the bottom runner of the cradle.

In addition to one or more aspects of the method or as an alternate, attaching the support bracket to the turbine includes attaching fasteners through mounting tabs of the intermediate support to mounting apertures in the support bracket to secure the module to the cradle.

In addition to one or more aspects of the method or as an alternate, supporting the forward shaft of the module on the forward support of the cradle includes: positioning the forward shaft on a semicylindrical bracket supported by the forward support.

In addition to one or more aspects of the method or as an alternate, the method includes clamping the forward shaft to the semicylindrical bracket with a semicircular bracket.

In addition to one or more aspects of the method or as an alternate, the method includes positioning a drive belt around the aft hub and between first and second guide blocks that are connected to the bottom runner and are disposed adjacent to the intermediate support.

In addition to one or more aspects of the method or as an alternate, the method includes spinning the compressor via the drive belt to identify unbalances and fixing balancing weights to the turbine via weight positioning slots in the support bracket to balance the module.

In addition to one or more aspects of the method or as an alternate, the method includes: while the module is on an assembly cart: connecting a forward tube clamp onto the forward shaft; connecting an aft tube clamp, that was previously positioned on the assembly cart, to onto the aft hub of the module so that an outer surface of the aft hub is surrounded by an inner surface of the aft tube clamp; securing a forward gripping arm of a hoist to the forward tube clamp; securing an aft gripping arm of the hoist to the aft tube clamp; and moving the hoist to move the module from the assembly cart to the cradle.

In addition to one or more aspects of the method or as an alternate, prior to securing the aft gripping arm of the hoist to the aft tube clamp, the method includes attaching fasteners through mounting tabs of the aft tube clamp and into mounting apertures in the support bracket.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
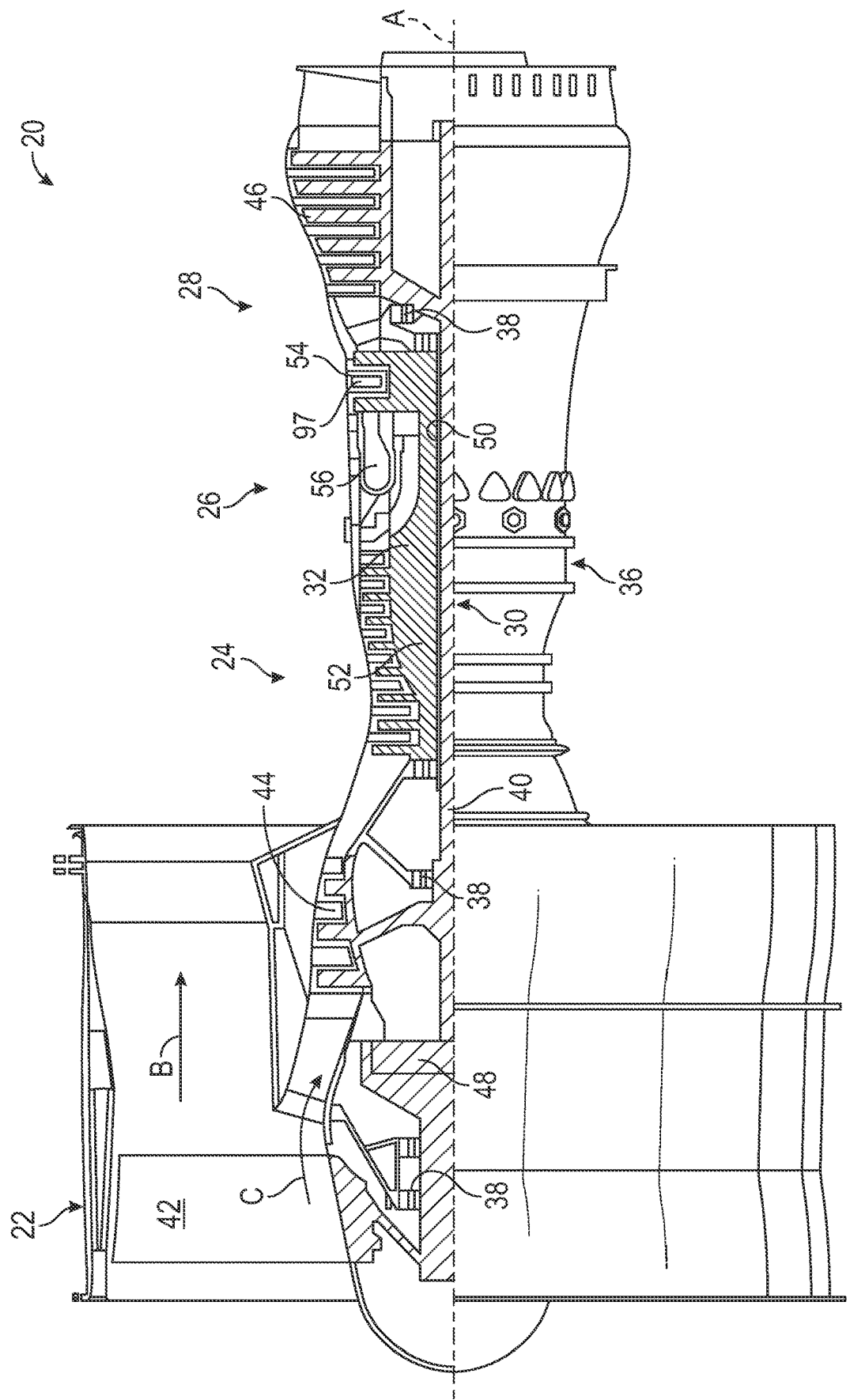
FIG. 1 is a partial cross-sectional view of a gas turbine engine, where a high pressure turbine includes trim balance, such as weights, applied utilizing the disclosed system and method, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The disclosed embodiments are not only applicable to geared turbofans but are applicable to all gas turbine engines. The high speed spool 32 includes an outer shaft 50 that interconnects a high pressure compressor 52 and high pressure turbine 54, which may have trim balancing weights 97. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
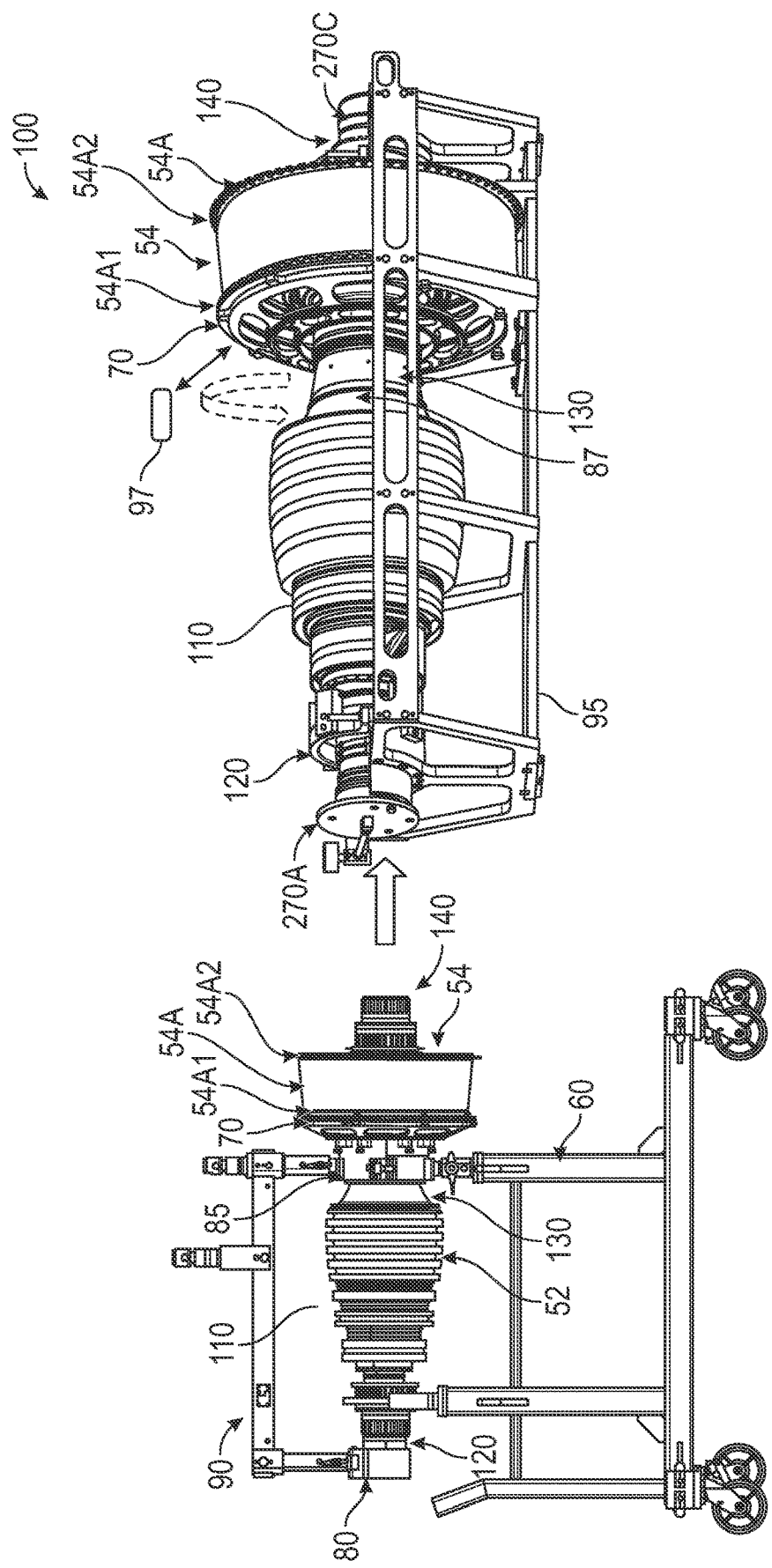
FIG. 2 shows components of a system for applying trim balance to a module of the gas turbine engine, and shows the module, where the components include an assembly cart, a hoist, a balancing cradle, forward and aft clamps, and a support bracket, according to an embodiment.

Turning to FIG. 2, various components of a system 100 are shown for applying trim balancing weights 97 to a module 110 of the gas turbine engine 20 of FIG. 1. The module 110 includes the high pressure compressor (for simplicity, a compressor) 52 having a forward bearing stack 120 over a forward shaft 120A (FIG. 3A) and extending aft to an aft hub 130. The module 110 also includes the high pressure turbine (for simplicity, a turbine) 54 within a turbine case 54A that extends from a case forward end 54A1 to a case aft end 54A2. The turbine 54 is connected to the aft hub 130 and extends aft to an aft bearing stack 140 over an aft shaft 140A (FIG. 3A).

Other components shown in FIG. 2, which are discussed in greater detail below, include an assembly cart 60 supporting the module 110. A support bracket 70 (or ring tool) is attached to the forward end 54A1 of the turbine case 54A, along with a forward clamp 80 that is clamped around the forward shaft 120A. An aft clamp 85 is clamped around the aft hub 130. The aft clamp 85 is secured to both the support bracket 70 and the cart 60, which at least in part secures the module 110 to the cart 60. A hoist (lifting device) 90 is secured to the forward clamp 80 and the aft clamp 85 to move the module 110 to a cradle 95. The cradle 95 supports the module 110 at the forward and aft shafts 120A, 140B and the cradle 95 is secured to the support bracket 70. The module 110 is spun on the cradle 95 to identify imbalances and apply balancing countermeasures, such as weights. As will be indicated below, trim balancing wights 97 may be secured to the turbine 54 via the support bracket 70. Also shown in FIG. 2 is the flow interrupter 87 that is formed into the rotor.

Figure 3B:
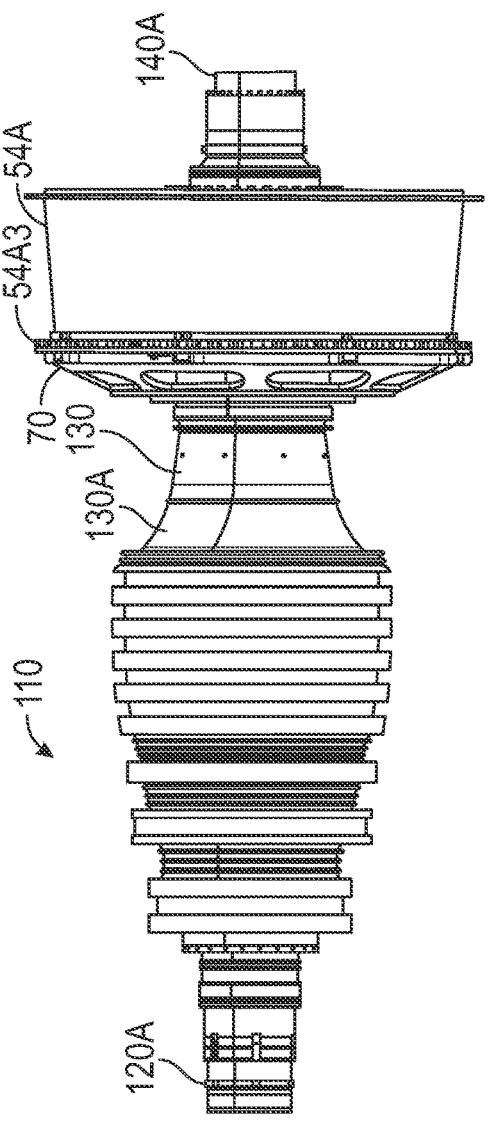
FIG. 3B shows the support bracket connected to the module.
Figure 3D:
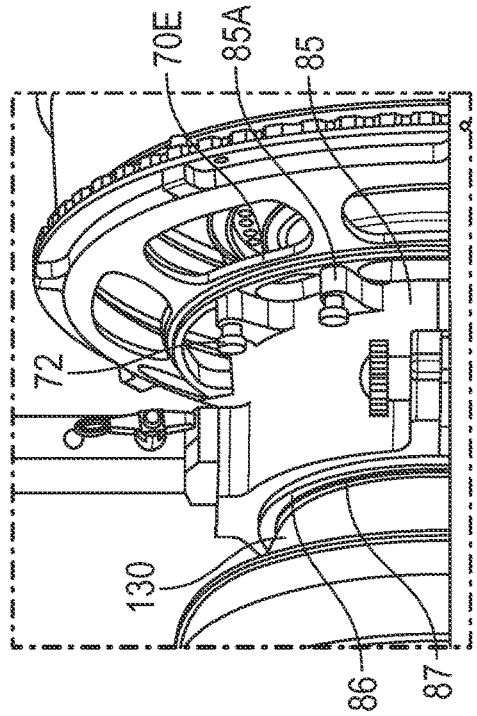
FIG. 3D shows a detail of the support bracket connected to the module and the aft clamp.
Figure 3A:
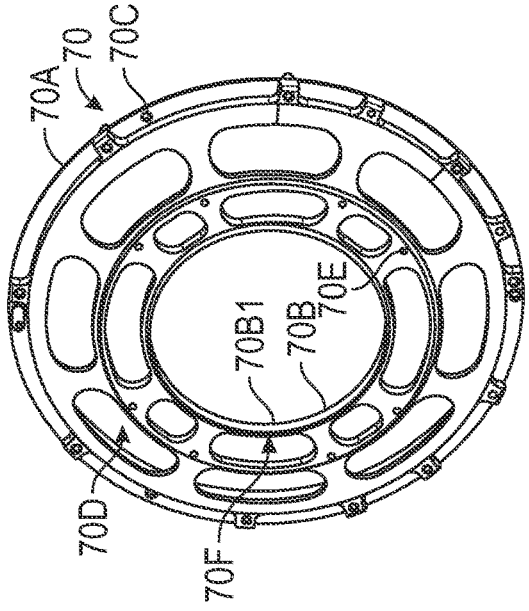
FIG. 3A shows additional aspects of the support bracket.
Figure 3C:
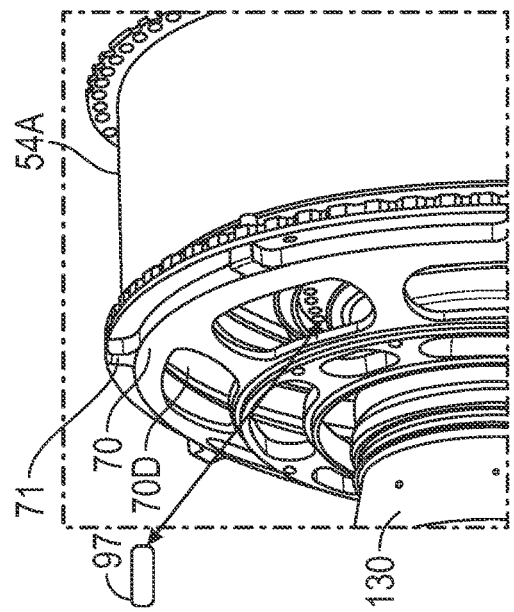
FIG. 3C shows a detail of the support bracket connected to the module.

Turning to FIGS. 3A-3D, the bracket 70 is disk shaped having an outer periphery 70A and a center aperture 70B surrounded by an inner periphery 70B1. The center aperture surrounds the aft hub 130 of the module 110 (FIG. 3B) when assembled on the cart 60 (FIG. 1). Outer mounting apertures 70C at the outer periphery 70A connect the bracket 70 with the turbine case 54A (FIGS. 3B and 3C). For example, the turbine case 54A has mounting apertures 54A3 which may be threaded, and outer fasteners 71 (FIG. 3C) such as bolts may connect the bracket 70 to the turbine case 54A. As discussed in greater detail below, the outer mounting apertures 70C are also utilized to secure the module 110 to the cradle 95.

Weight positioning slots 70D are formed in the bracket 70, between the center aperture 70B and the outer mounting apertures 70C. The slots 70D are distributed around a circumference of the bracket 70 and sized to allow insertion and manipulation of the weights 97 (FIG. 3C). Inner mounting apertures 70E are formed in the bracket 70 between the weight positioning slots 70D and the center aperture 70B. As shown in FIG. 3D, inner fasteners 72 (which may be the same as the outer fasteners 71) connect the bracket 70 with the aft clamp 85 utilizing the inner mounting apertures 70E of the bracket 70 and the mounting tabs 85A of the aft clamp 85. Weight saving apertures 70F may be located between the inner mounting apertures 70E and the center aperture 70B.

The bracket 70 may be frustoconical in its cross sectional (or profile) shape so that the outer periphery 70A is aft of the inner periphery 70B1.

The aft clamp 85 is installed first onto the aft (rear) hub 130 of the rotor 110. Then bracket (ring) 70 is installed. The flow interrupter 87, which is part of the rotor, and the rear HPC balance rim of the HPC 52, located at the aft clamp 85, then the ring 70 sets the reference position of the diffuser (not shown), allowing for proper alignment of the HPT 110 for install. The shape of the bracket 70 provides sufficient clearance to insert and manipulate balancing weights 97.

In addition to the various aspects of the embodiments disclosed herein, the support bracket 70 is configured to represent a diffuser static structure and allows the module 110 to be transported to the cradle 95. Because the bracket 70 is secured to the aft clamp 85 and the turbine 54, it is utilized for transportation with the hoist 90 between the cart 60 and the cradle 95. Additionally, the bracket 70 is utilized while spinning the module 110 to test for unbalances because it connects the turbine case 54A to the cradle 95. That is, from assembly to trim balancing, the bracket 70 is an integral component of the module 110 and enables proper balancing of the module 110.

As shown in FIG. 3B, the aft hub 130 has an outer surface 130A with a frustoconical shape. The aft tube clamp 85 has an inner surface 86 with a shape that is contoured to match the frustoconical shape of the outer surface 130A of the aft hub 130. The inner surface 86 may be formed by of protective material that prevents direct contact between the outer shell of the aft tube clamp 85 and the aft hub 130 to prevent damage to the rotor. This provides for a more secured gripping of the module 110 and avoids undesirable axial movement of the module 110 during transportation of the module 110 with the hoist 90.

Figure 4A:
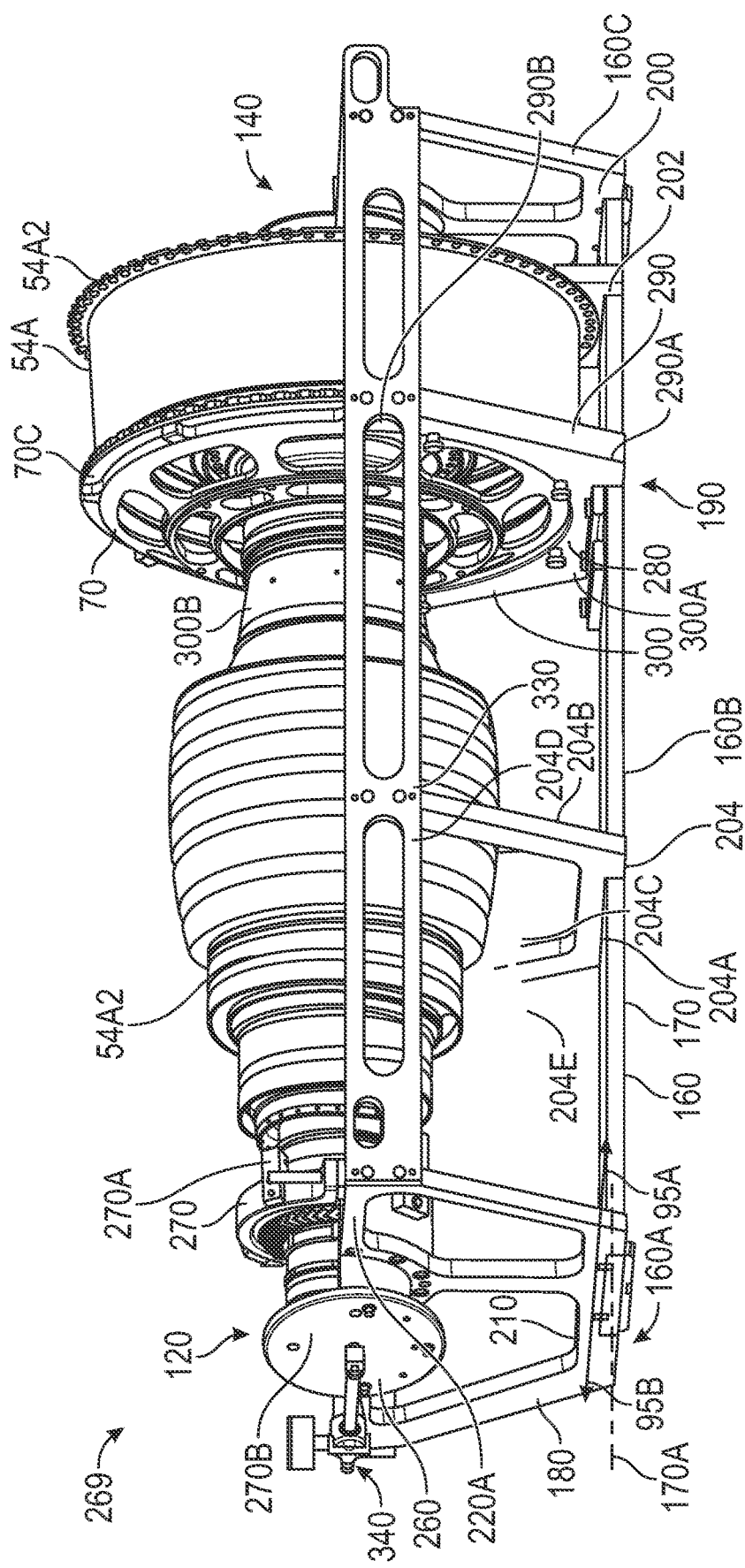
FIG. 4A shows the module secured to the balancing cradle and cradle supports that hold the module while trim balancing the module.

Turning to FIG. 4A additional aspects of the cradle 160 are shown. The cradle 160 has a forward end 160A, a cradle body 160B that extends from the forward end 160A to an aft end 160C. The cradle 160 body has a bottom runner 170 extending from the forward end 160A to the aft end 160C of the cradle 160. The bottom runner 170 is a rigid beam extending along a beam axis 170A, which in operation is horizontally oriented.

A forward support 180 is upright and attached to the bottom runner 170 at the forward end 160A and supports the forward shaft 120A. An intermediate support 190 is upright and attached to the bottom runner 170 intermediate the forward and aft ends 160A, 160C of the cradle 160 and supports the bracket 70. An aft support 200 is upright and attached to the bottom runner 170 that supports the aft shaft 140A. An aft-intermediate support 202 is upright and attached to the bottom runner 170 intermediate the intermediate support 190 and the aft end 160C and supports the aft end 54A2 of the turbine case 54A. A forward-intermediate support 204 is upright and attached to the bottom runner 170 intermediate the intermediate support 190 and the forward end 160A and provides additional cradle support as indicated below.

The forward and aft supports 180, 200 are configured the same as each other so that the forward support 180 will be discussed in greater detail. As shown in FIG. 4B, the forward support 180 has a first base member 210 extending transversely to the beam axis 170A, between first and second transverse sides 95A, 95B of the cradle 95, from a first end 210A to a second end 210B. First and second outer arms 230, 240 extend upwardly and away from each other at an acute angle from first and second lower ends 230A, 240A, at the first and second base ends 210A, 210B to the first and second top ends 230B, 240B. The first and second top ends 230B, 240B of the first and second outer arms 230, 240 are parallel with each other and face vertically for reasons discussed below. From the first and second lower ends 230A, 240A to the first and second top ends 230B, 240B, the first and second arms 230, 240 define first and second outer arm profile shapes. A top member 220 extends transversely to the beam axis 170A between the first and second top ends 230B, 240B of the first and second outer arms 230, 240 so that the top member 220 is longer than the first base member 210.

A center arm 250 is upright and extends between a center 210C of the first base member 210 and a center 220C of the top member 220. The center 220C of the top member 220 defines a semicircular profile. A semicylindrical bracket 260 is supported in the center 220C of the top member 220, which supports the forward shaft 120A. The forward end of the cradle has a loading detail 269. For example, a semicircular bracket 270 that locks onto the semicylindrical bracket 260 secures the forward shaft 120A to the forward support 180. Aft extending blocks 270A extend from the bracket 270 to the forward rotor of the compressor to axially lock the compressor in place on the cradle. A forward bearing 270B (FIG. 2) support the compressor in place on the cradle. The aft support 200, in the same configuration with an aft bearing 270C, supports the aft shaft 140A in the same way.

The intermediate support 190 has a second base member 280 extending transversely to the beam axis 170A and having a same length as the first base member 210. Third and fourth outer arms 290, 300 extend upwardly and away from each other, parallel to the first and second outer arms 230, 240. The third and fourth outer arms 290, 300 extend from third and fourth bottom ends 290A, 300A to third and fourth top ends 290B, 300B. The third and fourth top ends 290B, 300B are height-wise and transversely aligned with, and parallel to, the first and second top ends 230B, 240B of the first and second outer arms 230, 240. That is, the third and fourth outer arms 290, 300 have the same outer arm profile shape of the first and second outer arms 230, 240.

A continuous inner surface 310 is defined between the second base member 280 and the third and fourth outer arms 290, 300 and has a semicircular profile to seat the outer perimeter 70A of the support bracket 70. The intermediate support 190 has fastener apertures 190B (FIG. 4C) through which the outer fasteners 71 extend into the outer mounting apertures 70C of the support bracket 70, to fixedly mount the support bracket 70 to the cradle 160. The aft-intermediate support 202 also has a semicircular shape for receiving the aft end 54A2 of the turbine case 54A.

The forward-intermediate support 204 has a third lower base member 204A extending transversely to the beam axis 170A and having a same length as the first base member 210. Fifth and sixth outer arms 204B, 204C extend upwardly and away from each other, parallel to the first and second outer arms 230, 240, to fifth and sixth top ends 204D, 204E that are height-wise and transversely aligned with, and parallel to, the top ends 230B, 240B of the first and second outer arms 230, 240. That is, the fifth and sixth outer arms 204B, 204C have the same outer arm profile shapes of the first and second outer arms 230, 240.

A first support railing 330 extends between the forward and aft supports 180, 200 of the cradle 160 on the first transverse side 95A of the cradle 95. The first railing 330 connects with a top end of each of the supports on the first side of the cradle 95, except the aft-intermediate support 202 due to its shorter size. Similarly a second support railing 340 having a same configuration as the first support railing 330 extends between the forward and aft supports 180, 200 of the cradle 160 on the second transverse side 95B of the cradle 95. The second railing 340 connects with a top end of each of the supports on the second transverse side of the cradle 95, except the aft-intermediate support 202 due to its shorter size.

Figure 4C:
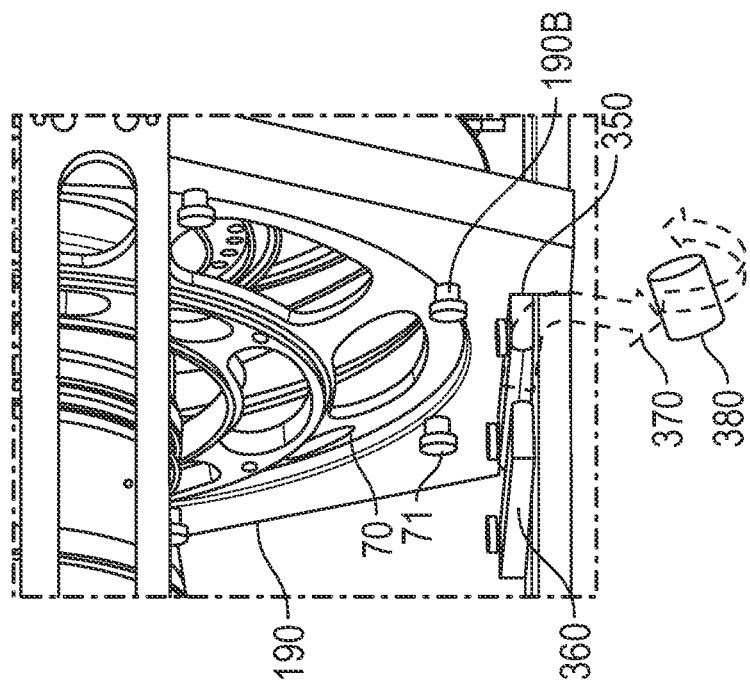
FIG. 4C is a detail of an intermediate support of the cradle.
Figure 4B:
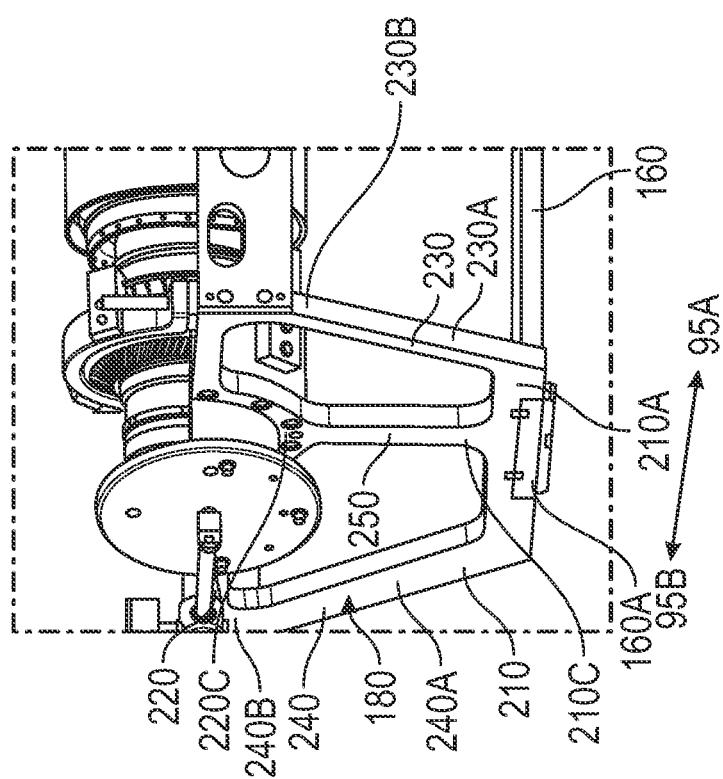
FIG. 4B is a detail of a front support of the cradle.

As shown in FIG. 4C, first and second guide blocks 350, 360 are connected to the bottom runner 170. The blocks 350, 360 extend transversely to the beam axis 170A, parallel to each other and are disposed adjacent to the intermediate support 190, under the aft hub 130 of the module 110. The blocks 350, 360 guide a drive belt 370, driven by a motor 380, that drives the module 110 to perform the trim balancing test. The blocks 350, 360 are formed of low friction material such as Teflon.

Figure 5:
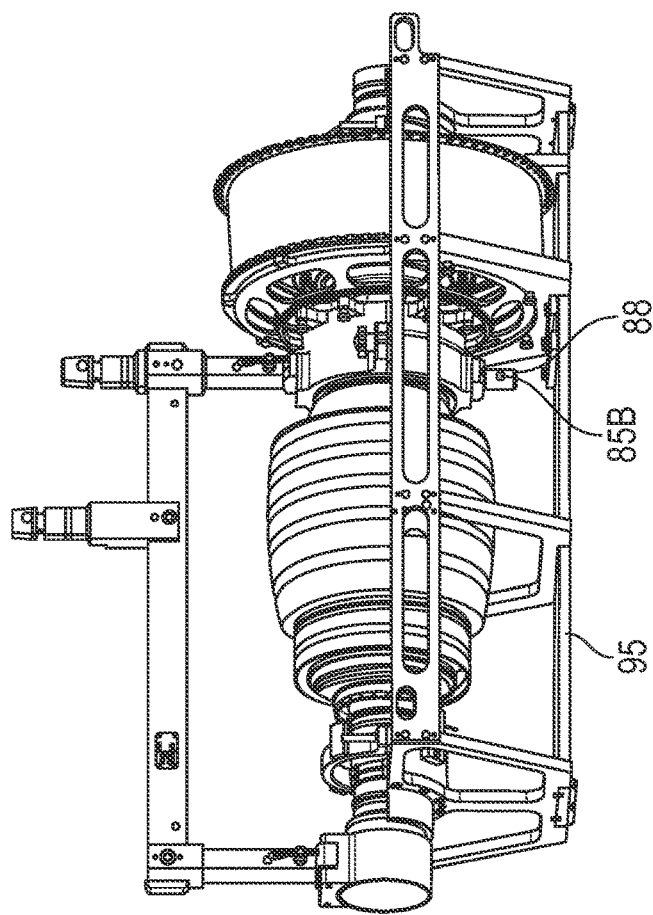
FIG. 5 shows additional aspects of the assembly cart and hoist and aspects of moving the module from the cart to the cradle via the hoist.
Figure 5:
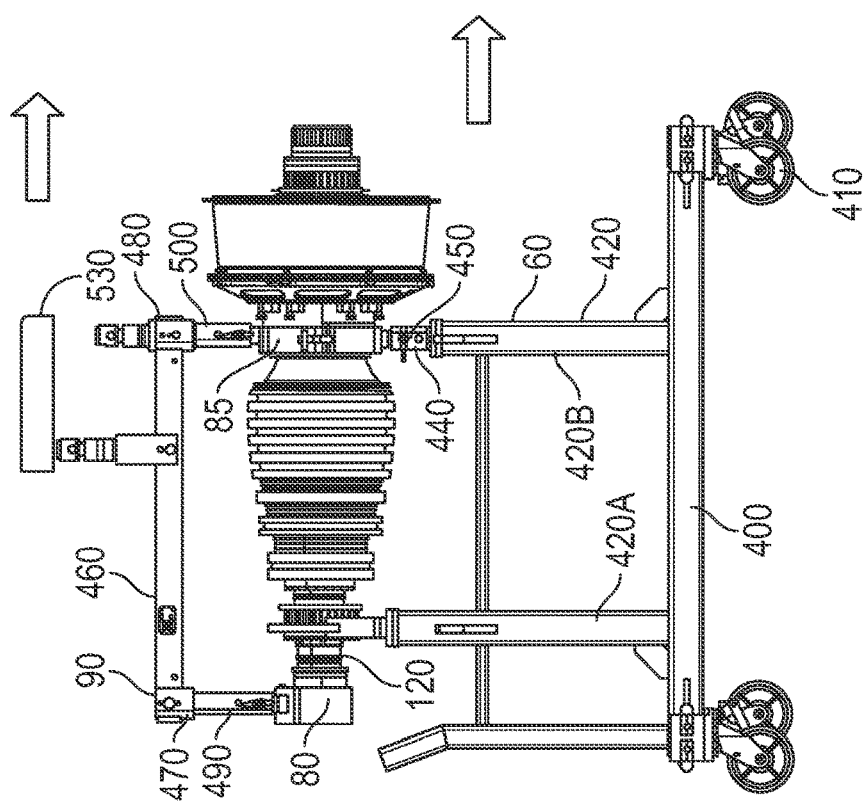

Turning to FIG. 5, additional aspects of the assembly cart 60 are shown. The cart 60 has a base 400 with wheels 410. Support arms 420 extend vertically upward from the base 400. A forward arm 420A supports the forward shaft 120A, aft of the forward clamp 80. An aft support arm 420B supports the module 110 via the aft clamp 85. For example, the aft support arm 420B has a top cap 440 defining a shaft that receives a bottom stub shaft 88 of the aft clamp 85. To secure the aft clamp 85 to the cart 60, a quick release mechanism, such as a pull pin 450, is inserted into a passage 85B formed in the bottom stub shaft 88. The pull pin 450 is inserted from an exterior of the top cap 440 of the aft support arm 420B. To remove the aft clamp 85 from the cart 60, the pull pin 450 is removed. Once removed, the module 110 is no longer fixedly secured to the cart 60.

The hoist 90 has a boom arm 460 extending from a forward end 470 to an aft end 480. A forward gripping arm 490 is fixedly connected to the boom arm forward end 470, extending downward to reach the forward clamp 80. An aft gripping arm 500 is connected to the boom arm aft end 480 and extends downward to reach the aft clamp 85. Forward and aft lifting arms 510, 520, extend upwardly from the boom arm 460. The forward lifting arm 510 is intermediate the forward and aft ends 470, 480 of the boom arm 460. The aft lifting arm 520 is aligned with the aft gripping arm 500 for proper reacting of the module weight. The lifting arms 510, 520 are connected to a machine 530 such as a crane to move the module to the cradle 95.

The forward and aft clamps 80, 85 may each have top stub shafts similar to the bottom stub shaft 88 of the aft clamp 85 for quick connecting and releasing from the lifting arms 510, 520 of the hoist 90. This way, the clamps 80, 85 may be more easily attached to the module 110 when the module 110 is supported by the cart 60 and more easily removed from the module 110 when the module 110 is supported by the cradle 95.

Figure 6:
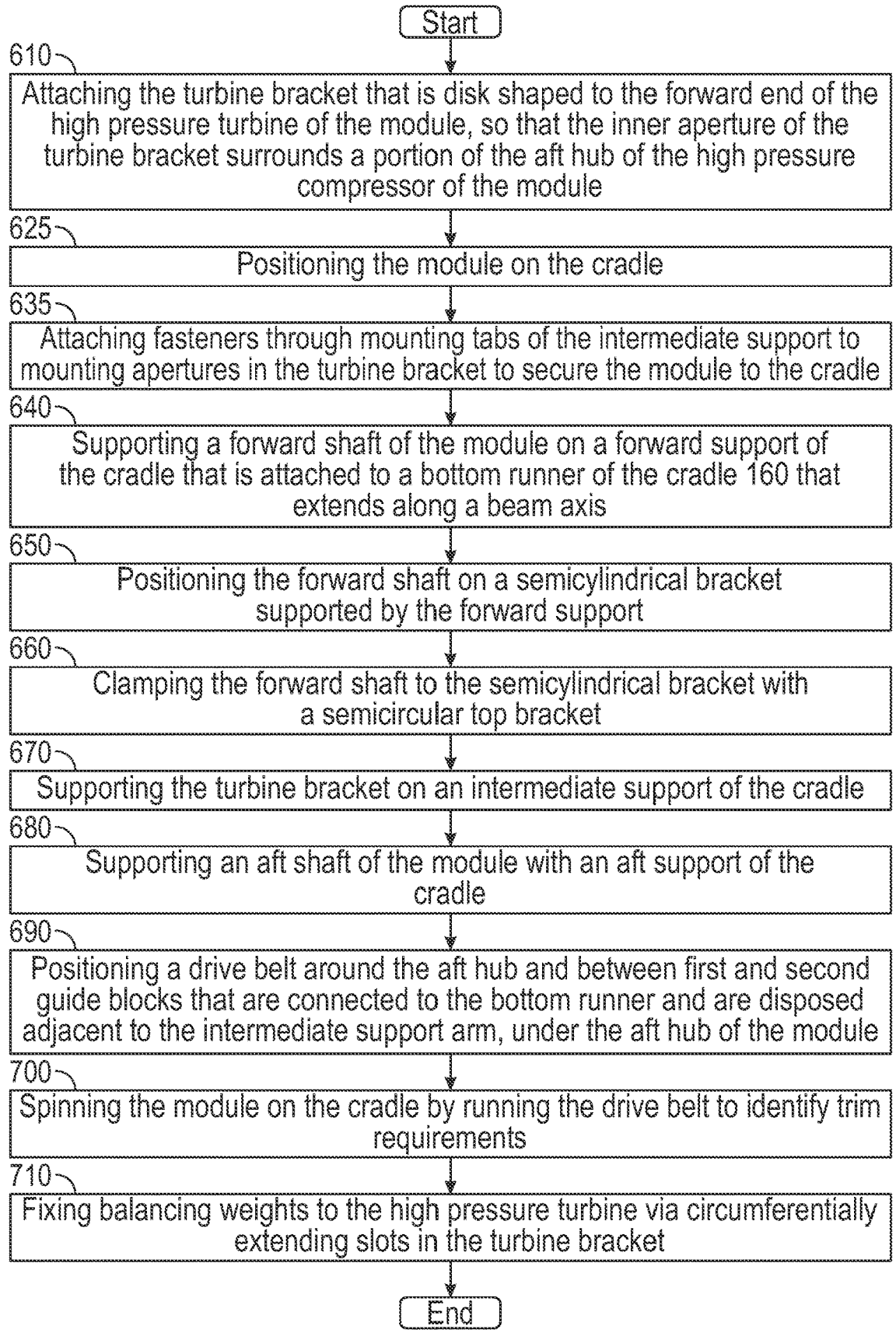
FIG. 6 is a flowchart showing a method of applying balancing trim to the module.

Turning to FIG. 6, a flowchart shows a method of applying balancing trim to the module 110. As shown in bock 610 the method includes attaching the support bracket 70 that is disk shaped to the forward end 54A1 of the high pressure turbine 54 of the module 110, so that the inner aperture 70B of the support bracket 70 surrounds a portion of the aft hub 130 of the high pressure compressor 52 of the module 110. As shown in block 625 the method includes positioning the module 110 on the cradle 160. As shown in block 635, attaching the support bracket 70 to the high pressure turbine (block 610) includes attaching inner fasteners 72 through mounting tabs 85A of the intermediate support 190 to mounting apertures 70E in the support bracket 70 to secure the module 110 to the cradle 160.

As shown in block 640, positioning the module 110 on the cradle 160 (block 630) includes supporting the forward shaft 120A of the module 110 on the forward support 180 of the cradle 160, which is attached to a bottom runner 170 of the cradle 160 that extends along a beam axis 170A. As shown in block 650, positioning the module 110 on the cradle 160 (block 630) also includes positioning the forward shaft 120A on the semicylindrical bracket 260 supported by the forward support 180. As shown in block 660, positioning the module 110 on the cradle 160 (block 630) also includes clamping the forward shaft 120A to the semicylindrical bracket 260 with a semicircular bracket 270. As shown in block 670 positioning the module 110 on the cradle 160 (block 630) also includes supporting the support bracket 70 on an intermediate support 190 of the cradle 160 that is attached to the bottom runner 170 of the cradle 160. As shown in block 680 positioning the module 110 on the cradle 160 (block 630) also includes supporting an aft shaft 140A of the module 110 with an aft support 200 of the cradle 160 that is attached to the bottom runner 170 of the cradle 160.

As shown in block 690, the method includes positioning a drive belt 370 around the aft hub 130 and between first and second guide blocks 360, 370 that are fixed to the bottom runner 170 and are disposed adjacent to the intermediate support 190, under the aft hub 130 of the module 110. As shown in block 700 the method includes spinning the module 110 on the cradle 95 by running the drive belt 370 to identify trim requirements. As shown in block 710, the method includes fixing balancing weights to the high pressure turbine 54 via slots 70D in the support bracket 70.

Figure 7:
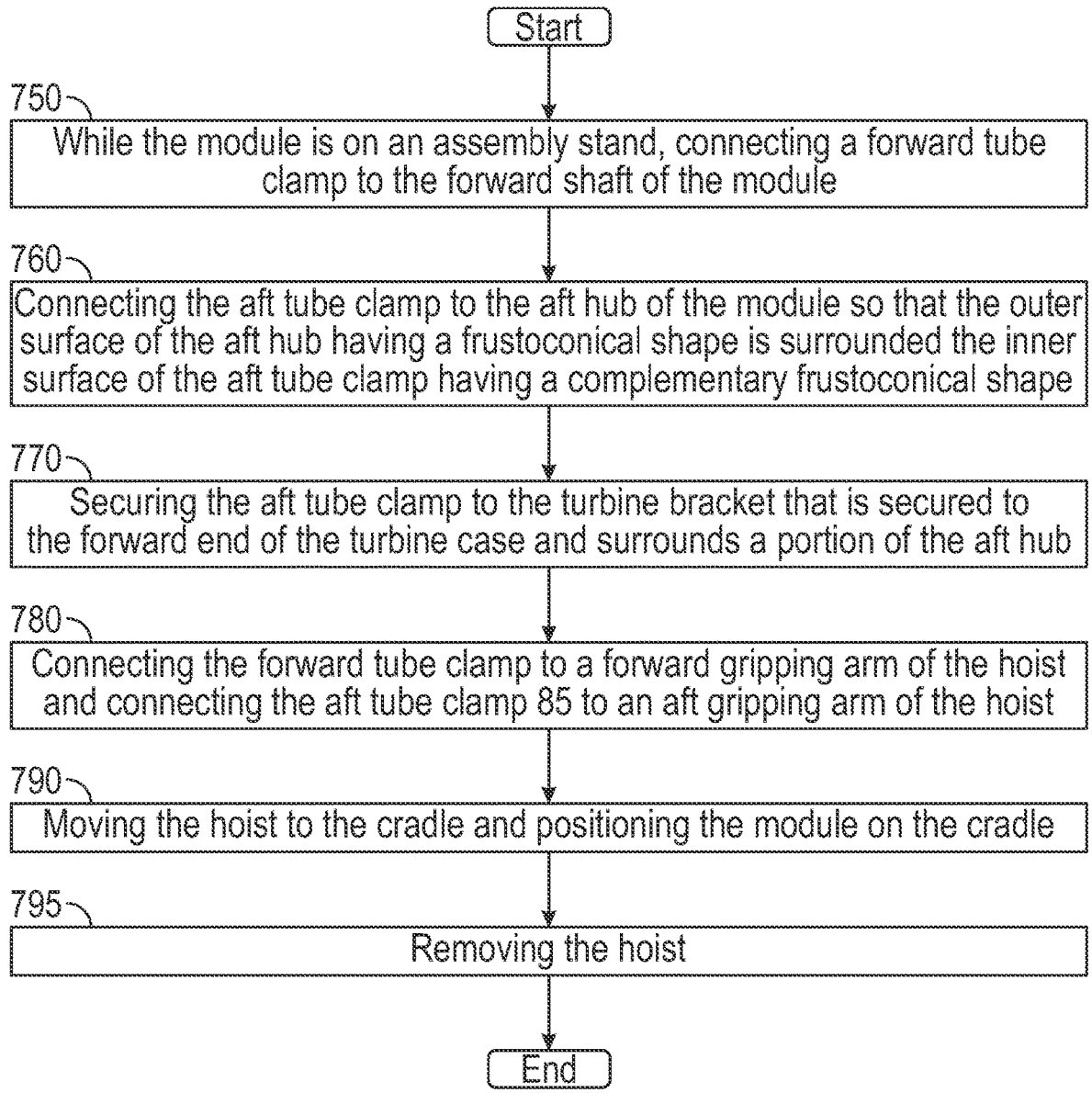
FIG. 7 is a flowchart showing a method of moving the module from the cart to the cradle.

Turning to FIG. 7, another flowchart shows a method of transporting the module 110 from the assembly cart 60 to the cradle 95. As shown in block 750, while the module is on the cart 60, the method includes connecting the forward tube clamp 80 to the forward shaft 120A of the module 110. As shown in block 760, the method includes connecting an aft tube clamp 85, that was previously positioned on the assembly cart 60, to the aft hub 130 of the module 110 so that the outer surface 130A of the aft hub 130 having a frustoconical shape is surrounded the inner surface 86 of the aft tube clamp 85 having a complementary frustoconical shape. As indicated, the aft clamp 85 is installed first onto the aft (rear) hub 130 of the rotor 110. Then bracket (ring) 70 is installed. The flow interrupter 87, which is part of the rotor, and the rear HPC balance rim of the HPC 52, located at the aft clamp 85, then the ring 70 sets the reference position of the diffuser (not shown), allowing for proper alignment of the HPT 110 for install. As shown in block 770, the method includes securing the aft tube clamp 85 to the support bracket 70 that is secured to the forward end 54A1 of the turbine case 54A and surrounds a portion of the aft hub 130. As shown in block 780 the method includes connecting the forward tube clamp 80 to a forward gripping arm 490 of the hoist 90 and connecting the aft tube clamp 85 to an aft gripping arm 500 of the hoist 90. As shown in block 790 the method includes moving the hoist 90 to the cradle 95 and positioning the module 110 on the cradle 95 (block 630). As shown in block 795 the method includes removing the hoist 90.

The embodiments involve assembling the high pressure compressor rotor with the high pressure turbine module and engine bearings and balancing the high pressure rotor assembly. The embodiments allow the execution of a balancing process utilizing the rotor assembly and the shafts at the ends of the rotor shaft. The use of the support bracket allows the assembly to be transported to the balancing cradle. This support bracket is used during assembly, transportation and balancing.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of applying balancing trim to a module of a gas turbine engine, comprising:
   attaching a support bracket to a forward end of a turbine of the module so that an inner aperture of the support bracket surrounds a portion of an aft hub of a compressor of the module; supporting a forward shaft of the module on a forward support of a cradle that is attached to a bottom runner of the cradle; supporting the support bracket on an intermediate support of the cradle that is attached to the bottom runner of the cradle; and supporting an aft shaft of the module with an aft support of the cradle that is attached to the bottom runner of the cradle, and
   while the module is on an assembly cart: connecting a forward tube clamp onto the forward shaft; connecting an aft tube clamp, that was previously positioned on the assembly cart, to onto the aft hub of the module so that an outer surface of the aft hub is surrounded by an inner surface of the aft tube clamp; securing a forward gripping arm of a hoist to the forward tube clamp; securing an aft gripping arm of the hoist to the aft tube clamp; and moving the hoist to move the module from the assembly cart to the cradle.

2. The method of claim 1, wherein attaching the support bracket to the turbine includes attaching fasteners through mounting tabs of the intermediate support to mounting apertures in the support bracket to secure the module to the cradle.

3. The method of claim 2, wherein supporting the forward shaft of the module on the forward support of the cradle includes positioning the forward shaft on a semicylindrical bracket supported by the forward support.

4. The method of claim 3, including clamping the forward shaft to the semicylindrical bracket with a semicircular bracket.

5. The method of claim 4 including positioning a drive belt around the aft hub and between first and second guide blocks that are connected to the bottom runner and are disposed adjacent to the intermediate support.

6. The method of claim 5, including spinning the compressor via the drive belt to identify unbalances and fixing balancing weights to the turbine via weight positioning slots in the support bracket to balance the module.

7. The method of claim 1, wherein, prior to securing the aft gripping arm of the hoist to the aft tube clamp, the method includes attaching fasteners through mounting tabs of the aft tube clamp and into mounting apertures in the support bracket.

* * * * *